(12) United States Patent
Bian et al.

(10) Patent No.: US 10,396,700 B2
(45) Date of Patent: Aug. 27, 2019

(54) MULTI-MOTOR SYSTEM, FREEZER COMPRISING THE SAME, AND METHODS FOR CONTROLLING THEREOF

(71) Applicant: Zhongshan Broad-Ocean Motor Co., Ltd., Zhongshan (CN)

(72) Inventors: Wenqing Bian, Zhongshan (CN); Ge Hu, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 785 days.

(21) Appl. No.: 14/985,368

(22) Filed: Dec. 30, 2015

(65) Prior Publication Data
US 2017/0047882 A1 Feb. 16, 2017

Related U.S. Application Data

(63) Continuation-in-part of application No. PCT/CN2015/087793, filed on Aug. 21, 2015.

(30) Foreign Application Priority Data

Aug. 13, 2015 (CN) .......................... 2015 1 0497978

(51) Int. Cl.
*H02P 5/00* (2016.01)
*H02P 5/74* (2006.01)
(Continued)

(52) U.S. Cl.
CPC ............ *H02P 29/60* (2016.02); *F25B 49/025* (2013.01); *H02P 5/00* (2013.01); *H02P 5/74* (2013.01);
(Continued)

(58) Field of Classification Search
CPC .............. F25B 49/025; F25B 2600/112; F25B 270/14; H02P 29/60; H02P 5/00;
(Continued)

(56) References Cited

U.S. PATENT DOCUMENTS

2008/0084171 A1 4/2008 Leehey et al.
2014/0132185 A1* 5/2014 Skinner ..................... H02P 5/74
318/34

FOREIGN PATENT DOCUMENTS

CN 101231015 A 7/2008
CN 202431562 U 9/2012
WO 9637737 A1 11/1996

* cited by examiner

*Primary Examiner* — Elizabeth J Martin
(74) *Attorney, Agent, or Firm* — Matthias Scholl P.C.; Matthias Scholl

(57) ABSTRACT

A multi-motor system, including a plurality of ECMs. The ECMs include a main ECM and a plurality of subordinate ECMs. A first temperature detection unit and a second temperature detection unit detect a temperature T1 and a temperature T2 at different positions, respectively; the main ECM automatically selects an operation parameter according to temperature differences between the temperature T1 and the temperature T2. The main ECM informs each subordinate ECM of the temperature T1 and the temperature T2, and each subordinate ECM selects an operation parameter according to the temperature T1 and the temperature T2. In operation, the main ECM informs each subordinate ECM of the temperature T1 and the temperature T2, and each subordinate ECM selects an operation parameter in accordance with the temperature T1 and the temperature T2.

30 Claims, 12 Drawing Sheets

(51) Int. Cl.
  *H02P 6/04*    (2016.01)
  *F25B 49/02*   (2006.01)
  *H02P 27/06*   (2006.01)
  *H02P 29/60*   (2016.01)
(52) U.S. Cl.
  CPC ................ *H02P 6/04* (2013.01); *H02P 27/06*
    (2013.01); *F25B 2600/112* (2013.01); *Y02B
    30/743* (2013.01)
(58) Field of Classification Search
  CPC .... H02P 27/06; H02P 5/74; H02P 6/04; F25D
    13/00
  See application file for complete search history.

MULTI-MOTOR SYSTEM, FREEZER COMPRISING THE SAME, AND METHODS FOR CONTROLLING THEREOF

CROSS-REFERENCE TO RELATED APPLICATIONS

This application is a continuation-in-part of International Patent Application No. PCT/CN2015/087793 with an international filing date of Aug. 21, 2015, designating the United States, now pending, and further claims priority benefits to Chinese Patent Application No. 201510497978.8 filed Aug. 13, 2015. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The invention relates to a multi-motor system, a freezer comprising the same, and methods for controlling thereof.

Description of the Related Art

Typically, the rotational velocity of an ECM (Electronically Commutated Motor) in a freezer is controlled by a special controller, and the controller has complex structure, high cost, and is very difficult to assemble. Although a multi-motor system has been developed to solve the problems, the rotational velocities of the ECMs are asynchronous.

SUMMARY OF THE INVENTION

In view of the above-described problems, it is one objective of the invention to provide a multi-motor system comprising a plurality of synchronous ECMs. The system features simple structure, low costs and convenient assembling.

It is a second objective of the invention to provide a method for controlling the multi-motor system which is adapted to synchronize the rotational velocities of the ECMs.

It is a third objective of the invention to provide a freezer comprising the multi-motor system which features lower cost and simple structure.

It is a fourth objective of the invention to provide a method for controlling the freezer which is adapted to synchronize the rotational velocities of the ECMs.

To achieve the above objectives, in accordance with one embodiment of the invention, there is provided a multi-motor system comprising a plurality of ECMs. Each ECM comprises a motor controller and a motor body. The ECMs comprise a main ECM, and a plurality of subordinate ECMs. The main ECM is connected to the subordinate ECMs via wire or wireless communication. A microprocessor of the motor controller of the main ECM is connected to a first temperature detection unit and a second temperature detection unit. The first temperature detection unit and the second temperature detection unit are disposed on different positions outside of the main ECM to detect a temperature T2 and a temperature T2. A microprocessor automatically selects an operation parameter of the main ECM in accordance with a temperature difference between the temperature T1 and the temperature T2. The main ECM informs each subordinate ECM of the temperature T1 and the temperature T2, and each subordinate ECM selects an operation parameter of the subordinate ECM in accordance with the temperature T1 and the temperature T2; or, the main ECM sets up operation parameters for each subordinate ECM in accordance with the temperature T1 and the temperature T2 at different positions, and orders each subordinate ECM to operate according to preset operation parameters.

In a class of this embodiment, the motor body comprises a stator assembly, a rotor assembly, and a shell assembly. The stator assembly and the rotor assembly are disposed inside the shell assembly. The stator assembly comprises a stator core and a coil winding wound around the stator core. The rotor assembly comprises a rotor core and a permanent magnet sheathed in the rotor core. The motor controller comprises a control circuit board. The control circuit board is provided with a microprocessor, an inverter circuit, and a detecting unit of operation parameter of the motor. The detecting unit of operation parameter of the motor transmits motor operation data to the microprocessor. An output end of the microprocessor is connected to an input end of the inverter circuit. An output end of the inverter circuit is connected to the coil winding wound around the stator core.

In a class of this embodiment, the operation parameter of the motor refers to rotational speed, operating current, torque, or air volume.

In a class of this embodiment, a rotational velocity V of the main ECM comprises two gears of rotational velocity S1 and S2. When a temperature difference ΔT between the temperature T1 and the temperature T2 is smaller than a preset value t0, the microprocessor selects a first gear S1 and controls the motor to operate at a constant speed of the first gear of rotational velocity S1 ; when the temperature difference ΔT between the temperature T1 and the temperature T2 is bigger than the preset value t0, the microprocessor selects a second gear S2 and controls the motor to operate at a constant speed of the second gear of rotational velocity S2.

In a class of this embodiment, a rotational velocity V of the main ECM comprises five gears of rotational velocity S1, S2, S3, S4 and S5. When a temperature difference ΔT between the temperature T1 and the temperature T2 is smaller than or equals to a preset value t00, the microprocessor selects a first gear S1 and controls the motor to operate at a constant speed of the first gear of rotational velocity S1 ; when the temperature difference ΔT between the temperature T1 and the temperature T2 is bigger than the preset value t00, and is smaller than or equals to a preset value t01, the microprocessor selects a second gear S2 and controls the motor to operate at a constant speed of the second gear of rotational velocity S2 ; when the temperature difference ΔT between the temperature T1 and the temperature T2 is bigger than the preset value t01, and is smaller than or equals to a preset value t02, the microprocessor selects a third gear S3 and controls the motor to operate at a constant speed of the third gear of rotational velocity S3; when the temperature difference ΔT between the temperature T1 and the temperature T2 is bigger than the preset value t02, and is smaller than or equals to a preset value t03, the microprocessor selects a fourth gear S4 and controls the motor to operate at a constant speed of the fourth gear of rotational velocity S4; when the temperature difference ΔT between the temperature T1 and the temperature T2 is bigger than the preset value t03, the microprocessor selects a fifth gear S5 and controls the motor to operate at a constant speed of the fifth gear of rotational velocity S5.

In a class of this embodiment, the first temperature detection unit and the second temperature detection unit are thermistor-type temperature detection units.

In a class of this embodiment, the microprocessor in the motor controller of each ECM is connected to a serial communication module. The main ECM and the subordinate ECMs are connected to a bus via the respective serial communication module for communication.

In a class of this embodiment, the microprocessor in the motor controller of each ECM is connected to a wireless communication module. The main ECM and the subordinate ECMs are communicated via the respective wireless communication module.

In a class of this embodiment, the wireless communication module is selected from bluetooth module, satellite communications module, and mobile communication module.

In a class of this embodiment, the main ECM is provided with a programming port module to set up rotational velocities, and the subordinate ECMs are not provided with the programming port module to save costs and simplify structure.

In a class of this embodiment, once the microprocessor determines a gear of rotational velocity, the rotational velocity is not allowed to change within n second(s), and $1<n<300$.

In a class of this embodiment, the temperature difference $\Delta T$ is an interval value between to−tb and to+tb, wherein to is a critical temperature difference, tb is an allowed fluctuant range of the temperature difference. When the temperature difference decreases from a higher temperature difference to the interval value, the microprocessor selects the first gear of rotational velocity S1; when the temperature difference increases from a lower temperature difference to the interval value, the microprocessor selects the second gear of rotational velocity S2. The temperature difference falls within the interval value between to−tb and to+tb. The rotational velocity of the main ECM is constant.

A method for controlling the multi-motor system, wherein the multi-motor system comprises a plurality of ECMs. The ECMs comprise a main ECM, and a plurality of subordinate ECMs. The main ECM and the subordinate ECMs are one way communicated. A microprocessor of a motor controller of the main ECM is connected to a first temperature detection unit and a second temperature detection unit. The first temperature detection unit and the second temperature detection unit are disposed on different positions outside of the main ECM to detect a temperature T1 and a temperature T2. The microprocessor automatically selects an operation parameter of the main ECM in accordance with a temperature difference between the temperature T1 and the temperature T2. The main ECM informs each subordinate ECM of the temperature T1 and the temperature T2, and each subordinate ECM selects an operation parameter of a subordinate ECM in accordance with the temperature T1 and the temperature T2, and each subordinate ECM does not reply to the main ECM; or, the main ECM sets up operation parameters for each subordinate ECM in accordance with the temperature T1 and the temperature T2 at different positions, and orders each subordinate ECM to operate according to preset operation parameters, and each subordinate ECM does not reply to the main ECM. The operation parameter of the motor refers to rotational speed, operating current, torque, or air volume.

In a class of this embodiment, the main ECM and the subordinate ECMs are communicated via a bus.

In a class of this embodiment, the main ECM and the subordinate ECMs are communicated via a wireless module.

Also provided is a method for controlling the multi-motor system. The multi-motor system comprises a plurality of ECMs. The ECMs comprise a main ECM, and a plurality of subordinate ECMs. A communication of the main ECM and the subordinate ECMs is two way. A microprocessor of a motor controller of the main ECM is connected to a first temperature detection unit and a second temperature detection unit. The first temperature detection unit and the second temperature detection unit are disposed on different positions outside of the main ECM to detect a temperature T1 and a temperature T2. The microprocessor automatically selects an operation parameter of the main ECM in accordance with a temperature difference between the temperature T1 and the temperature T2. The main ECM informs each subordinate ECM of the temperature T1 and the temperature T2, and each subordinate ECM selects an operation parameter of the subordinate ECM in accordance with the temperature T1 and the temperature T2, and each subordinate ECM replies to the main ECM that data has been received; or, the main ECM sets up operation parameters for each subordinate ECM in accordance with the temperature T1 and the temperature T2 at different positions, and orders each subordinate ECM to operate according to preset operation parameters, and each subordinate ECM replies to the main ECM that data has been received. The operation parameter of the motor refers to rotational speed, operating current, torque, or air volume.

In a class of this embodiment, the main ECM and the subordinate ECMs are communicated via a bus.

In a class of this embodiment, the main ECM and the subordinate ECMs are communicated via a wireless module.

In a class of this embodiment, steps of a two way communication between the main ECM and each subordinate ECMs are as follows:
  a) defining every T second(s) as a communication cycle;
  b) sending a temperature difference report or rotational velocity report from the main ECM to the subordinate ECMs which are not allowed to reply in Ta (Ta<T) second(s) from a beginning of every cycle;
  c) allowing the subordinate ECMs to reply to the main ECM from Ta (Ta<T) second(s) to an end of every cycle, during which the main ECM is not allowed to send; the subordinate ECMs monitoring the bus to determine whether other motors are sending signals to the bus;
  d) sending a report immediately from the subordinate ECM when the bus is idle;
  e) waiting for a random interval to send the report from the subordinate ECM when the bus is busy; and
  f) waiting for next cycle to send the report from the subordinate ECM again when the bus is always busy during this cycle.

In a class of this embodiment, steps of the two way communication between the main ECM and each subordinate ECMs are as follows:
  a1) defining every T second(s) as a communication cycle;
  b1) sending a temperature difference report or rotational velocity report from the main ECM to the subordinate ECMs which are not allowed to reply in Ta (Ta<T) second(s) from a beginning of every cycle;
  c1) allowing the subordinate ECMs to reply to the main ECM from Ta (Ta<T) second(s) to an end of every cycle, during which the main ECM is not allowed to send; the subordinate ECMs monitoring the bus to determine whether other motors are sending signals to the bus;

d1) sending a report immediately from the subordinate ECM when the bus is idle;

e1) waiting for a random interval to send the report from the subordinate ECM when the bus is busy;

f1) waiting for a random interval and returning to c1 when a report collision happens; and g1) waiting for next cycle to send the report from the subordinate ECM again when the bus is always busy during this cycle.

In a class of this embodiment, the main ECM and the subordinate ECMs are assigned no addresses.

In a class of this embodiment, the main ECM and the subordinate ECMs are assigned independent addresses, respectively.

A freezer comprises a compressor, a coil evaporator, and an evaporator fan. The evaporator fan comprises a fan shell, a multi-motor system and several groups of fan blades. The compressor supplies a cooling agent for the coil evaporator. Beside an air inlet of the fan shell is provided with the coil evaporator. Another side of the fan shell is provided with an air outlet. The multi-motor system is disposed in the fan shell. Several groups of fan blades are driven by the multi-motor system. The multi-motor system and the fan blades are disposed between the coil evaporator and the air outlet. The multi-motor system comprises ECMs which are adapted to automatically control speed. A first temperature detection unit which is connected to the main ECM is disposed beside the air inlet of the fan shell to detect a temperature T1 of hot air. A second temperature detection unit which is connected to the main ECM is disposed beside the air outlet of the fan shell to detect a temperature T2 of cold air.

A method for controlling the freezer, the freezer comprises a compressor, a coil evaporator, and an evaporator fan. The evaporator fan comprises a fan shell, a multi-motor system and several groups of fan blades. The compressor supplies a cooling agent for the coil evaporator. Beside an air inlet of the fan shell is provided with the coil evaporator. Another side of the fan shell is provided with an air outlet. The multi-motor system is disposed in the fan shell. Several groups of fan blades are driven by the multi-motor system. The multi-motor system and the fan blades are disposed between the coil evaporator and the air outlet. The multi-motor system comprises ECMs which are adapted to automatically control speed. A first temperature detection unit which is connected to the main ECM is disposed beside the air inlet of the fan shell to detect a temperature T1 of hot air. A second temperature detection unit which is connected to the main ECM is disposed beside the air outlet of the fan shell to detect a temperature T2 of cold air. A microprocessor automatically selects an operation parameter of the main ECM in accordance with a temperature difference between the temperature T1 and the temperature T2. The main ECM and the subordinate ECMs are one way communicated. The main ECM informs each subordinate ECM of the temperature T1 and the temperature T2, and each subordinate ECM selects an operation parameter of a subordinate ECM in accordance with the temperature T1 and the temperature T2, and each subordinate ECM does not reply to the main ECM; or, the main ECM sets up operation parameters for each subordinate ECM in accordance with the temperature T1 and the temperature T2 at different positions, and orders each subordinate ECM to operate according to preset operation parameters, and each subordinate ECM does not reply to the main ECM. The operation parameter of the motor refers to rotational speed, operating current, torque, or air volume. The main ECM and the subordinate ECMs are communicated via a bus or a wireless module.

A method for controlling the freezer, the freezer comprises a compressor, a coil evaporator, and an evaporator fan. The evaporator fan comprises a fan shell, a multi-motor system and several groups of fan blades. The compressor supplies a cooling agent for the coil evaporator. Beside an air inlet of the fan shell is provided with the coil evaporator. Another side of the fan shell is provided with an air outlet. The multi-motor system is disposed in the fan shell. Several groups of fan blades are driven by the multi-motor system. The multi-motor system and the fan blades are disposed between the coil evaporator and the air outlet. The multi-motor system comprises ECMs which are adapted to automatically control speed. A first temperature detection unit which is connected to the main ECM is disposed beside the air inlet of the fan shell to detect a temperature T1 of hot air. A second temperature detection unit which is connected to the main ECM is disposed beside the air outlet of the fan shell to detect a temperature T2 of cold air. A microprocessor automatically selects an operation parameter of the main ECM in accordance with a temperature difference between the temperature T1 and the temperature T2. The main ECM informs each subordinate ECM of the temperature T1 and the temperature T2, and each subordinate ECM selects an operation parameter of the subordinate ECM in accordance with the temperature T1 and the temperature T2, and each subordinate ECM replies to the main ECM that data has been received; or, the main ECM sets up operation parameters for each subordinate ECM in accordance with the temperature T1 and the temperature T2 at different positions, and orders each subordinate ECM to operate according to preset operation parameters, and each subordinate ECM replies to the main ECM that data has been received. The operation parameter of the motor refers to rotational speed, operating current, torque, or air volume.

In a class of this embodiment, steps of a two way communication between the main ECM and each subordinate ECMs are as follows:

a) defining every T second(s) as a communication cycle;

b) sending a temperature difference report or rotational velocity report from the main ECM to the subordinate ECMs which are not allowed to reply in Ta (Ta<T) second(s) from a beginning of every cycle;

c) allowing the subordinate ECMs to reply to the main ECM from Ta (Ta<T) second(s) to an end of every cycle, during which the main ECM is not allowed to send; the subordinate ECMs monitoring the bus to determine whether other motors are sending signals to the bus;

d) sending a report immediately from the subordinate ECM when the bus is idle;

e) waiting for a random interval to send the report from the subordinate ECM when the bus is busy; and f) waiting for next cycle to send the report from the subordinate ECM again when the bus is always busy during this cycle.

In a class of this embodiment, steps of the two way communication between the main ECM and each subordinate ECMs are as follows:

a1) defining every T second(s) as a communication cycle;

b1) sending a temperature difference report or rotational velocity report from the main ECM to the subordinate ECMs which are not allowed to reply in Ta (Ta<T) second(s) from a beginning of every cycle;

c1) allowing the subordinate ECMs to reply to the main ECM from Ta (Ta<T) second(s) to an end of every cycle, during which the main ECM is not allowed to send; the subordinate ECMs monitoring the bus to determine whether other motors are sending signals to the bus;

d1) sending a report immediately from the subordinate ECM when the bus is idle;

e1) waiting for a random interval to send the report from the subordinate ECM when the bus is busy;

f1) waiting for a random interval and returning to c1 when a report collision happens; and h1) waiting for next cycle to send the report from the subordinate ECM again when the bus is always busy during this cycle.

Compared with existing technologies, advantages of the multi-motor system, the freezer comprising the same, and methods for controlling thereof are as follows:

1. The multi-motor system of the invention comprises a plurality of ECMs. The ECMs comprise a main ECM, and a plurality of subordinate ECMs. The main ECM is connected to the subordinate ECMs via wire or wireless communication. A microprocessor of a motor controller of the main ECM is connected to a first temperature detection unit and a second temperature detection unit. The first temperature detection unit and the second temperature detection unit are disposed on different positions outside of the main ECM to detect a temperature T2 and a temperature T2. The microprocessor automatically selects an operation parameter of the main ECM in accordance with a temperature difference between the temperature T1 and the temperature T2. The main ECM informs each subordinate ECM of the temperature T1 and the temperature T2, and each subordinate ECM selects an operation parameter of a subordinate ECM in accordance with the temperature T1 and the temperature T2; or, the main ECM sets up operation parameters for each subordinate ECM in accordance with the temperature T1 and the temperature T2 at different positions, and orders each subordinate ECM to operate according to preset operation parameters. The subordinate ECMs are not provided with the first temperature detection unit and the second temperature detection unit, allowing the invention to feature simple structure, low cost and convenient assembling.

2. The rotational velocity V of the main ECM of the multi-motor system can select from five gears S1, S2, S3, S4 and S5 in accordance with the temperature difference ΔT of the temperature T1 and the temperature T2, thus control of the rotational velocity is more accurate.

3. The first temperature detection unit and the second temperature detection unit are thermistor-type temperature detection units which features high detection accuracy and low cost. The programming port module of the ECM is configured to setup rotational velocity, allowing a flexible and convenient application.

4. A method for controlling the multi-motor system is adapted to more reliably synchronize the rotational velocity of each ECM. The microprocessor of motor controller of the main ECM automatically selects an operation parameter of the main ECM in accordance with a temperature difference between the temperature T1 and the temperature T2. The main ECM informs each subordinate ECM of the temperature T1 and the temperature T2, and each subordinate ECM selects an operation parameter of a subordinate ECM in accordance with the temperature T1 and the temperature T2, and each subordinate ECM does not reply to the main ECM; or, the main ECM sets up operation parameters for each subordinate ECM in accordance with the temperature T1 and the temperature T2 at different positions, and orders each subordinate ECM to operate according to preset operation parameters, and each subordinate ECM does not reply to the main ECM. The operation parameter of the motor refers to rotational speed, operating current, torque, or air volume.

5. A method for controlling the multi-motor system is adapted to more reliably synchronize the rotational velocity of each ECM. The microprocessor of motor controller of the main ECM automatically selects an operation parameter of the main ECM in accordance with a temperature difference between the temperature T1 and the temperature T2. The main ECM informs each subordinate ECM of the temperature T1 and the temperature T2, and each subordinate ECM selects an operation parameter of a subordinate ECM in accordance with the temperature T1 and the temperature T2, and each subordinate ECM replies to the main ECM that data has been received; or, the main ECM sets up operation parameters for each subordinate ECM in accordance with the temperature T1 and the temperature T2 at different positions, and orders each subordinate ECM to operate according to preset operation parameters, and each subordinate ECM replies to the main ECM that data has been received. The operation parameter of the motor refers to rotational speed, operating current, torque, or air volume.

6. A freezer comprising the multi-motor system features a simple structure, low cost and convenient assembling.

7. A method for controlling the freezer is adapted to more reliably synchronize the rotational velocity of each ECM.

8. The rotational velocity V of the main ECM comprises two gears of rotational velocity S1 and S2. When a temperature difference ΔT between the temperature T1 and the temperature T2 is smaller than a preset value t0, the microprocessor selects a first gear S1 and controls the motor to operate at a constant speed of the first gear of rotational velocity S1; when the temperature difference ΔT between the temperature T1 and the temperature T2 is bigger than the preset value t0, the microprocessor selects a second gear S2 and controls the motor to operate at a constant speed of the second gear of rotational velocity S2. As t0 is a critical value, in actual application, when the temperature difference changes around t0, the motor tends to shift between S1 and S2, causing an unstable operation, thus the following two solutions are put forward:

a) Once the microprocessor determines a gear of rotational velocity, the rotational velocity is not allowed to change within n second(s), and 1<n<300.

b) The temperature difference ΔT is an interval value between to−tb and to+tb, wherein to is a critical temperature difference, tb is an allowed fluctuant range of the temperature difference. When the temperature difference decreases from a higher temperature difference to the interval value, the microprocessor selects the first gear of rotational velocity S1; when the temperature difference increases from a lower temperature difference to the interval value, the microprocessor selects the second gear of rotational velocity S2. The temperature difference falls within the interval value between to−tb and to+tb. The rotational velocity of the main ECM is constant.

DETAILED DESCRIPTION OF THE EMBODIMENTS

For further illustrating the invention, experiments detailing a multi-motor system, a freezer comprising the same, and methods for controlling thereof are described below. It should be noted that the following examples are intended to describe and not to limit the invention.

Example 1

Figure 1:
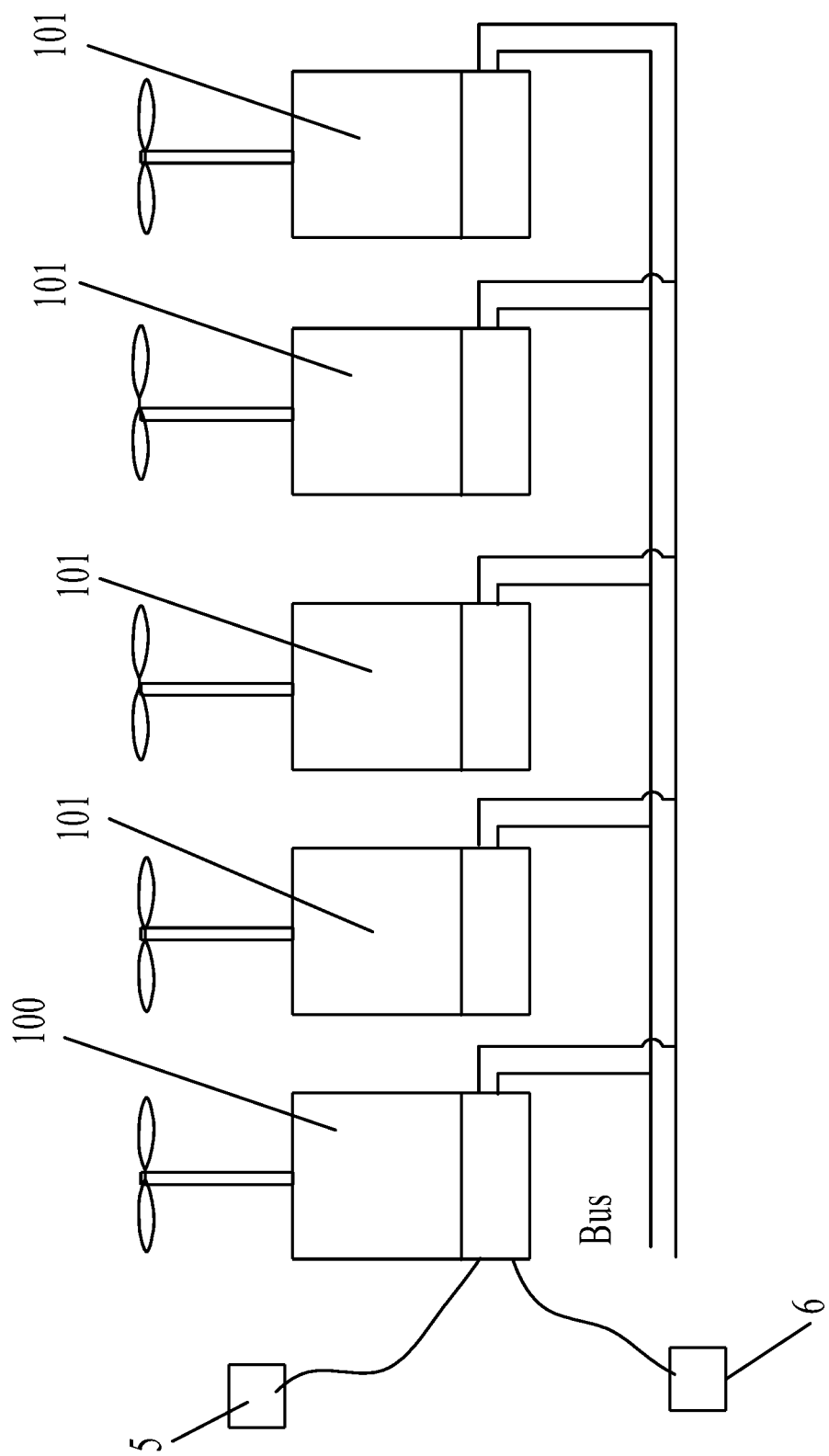
FIG. 1 is a first schematic diagram of a multi-motor system of example 1 of the invention.
Figure 2:
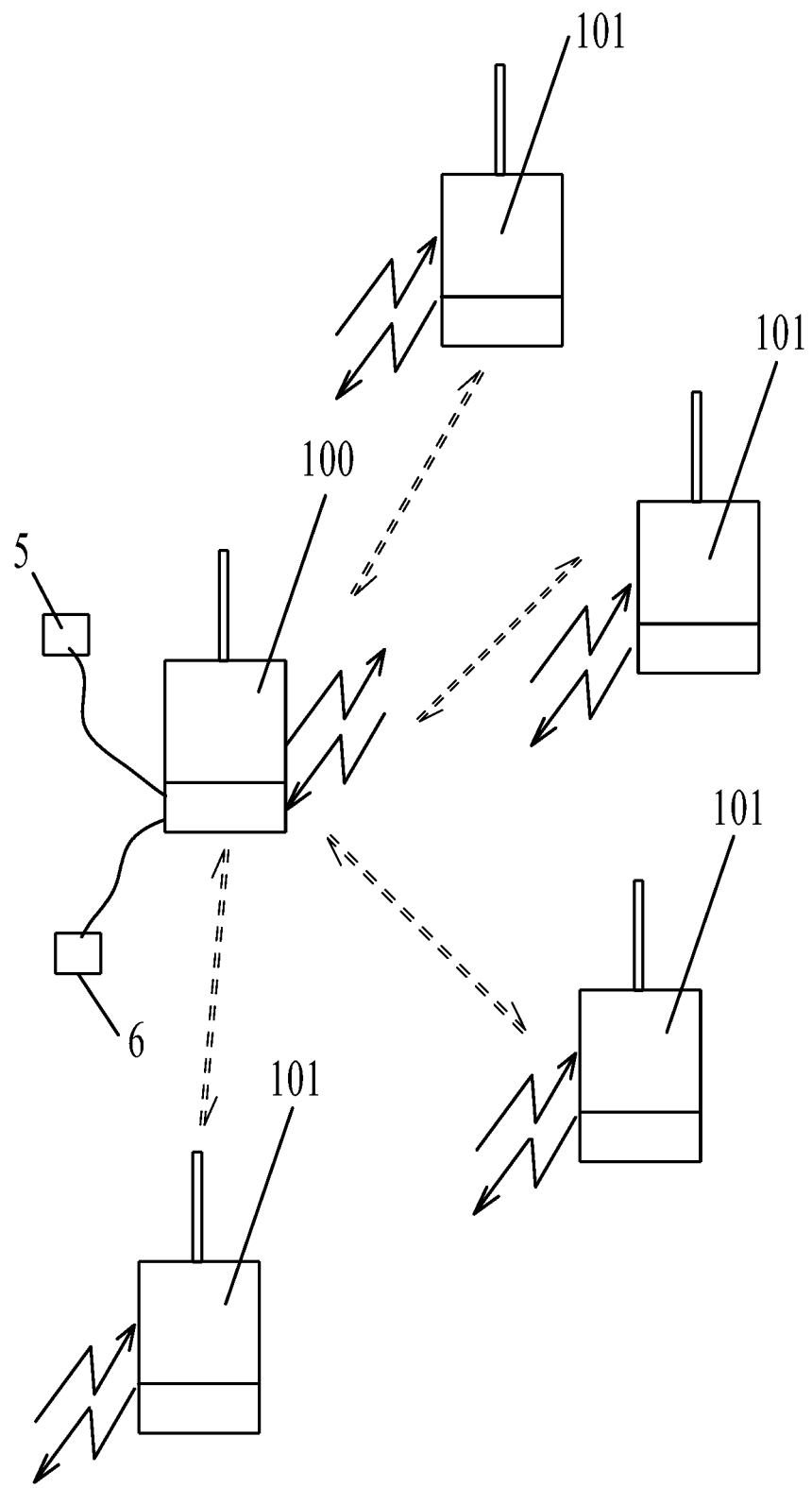
FIG. 2 is a second schematic diagram of a multi-motor system of example 1 of the invention.
Figure 3:
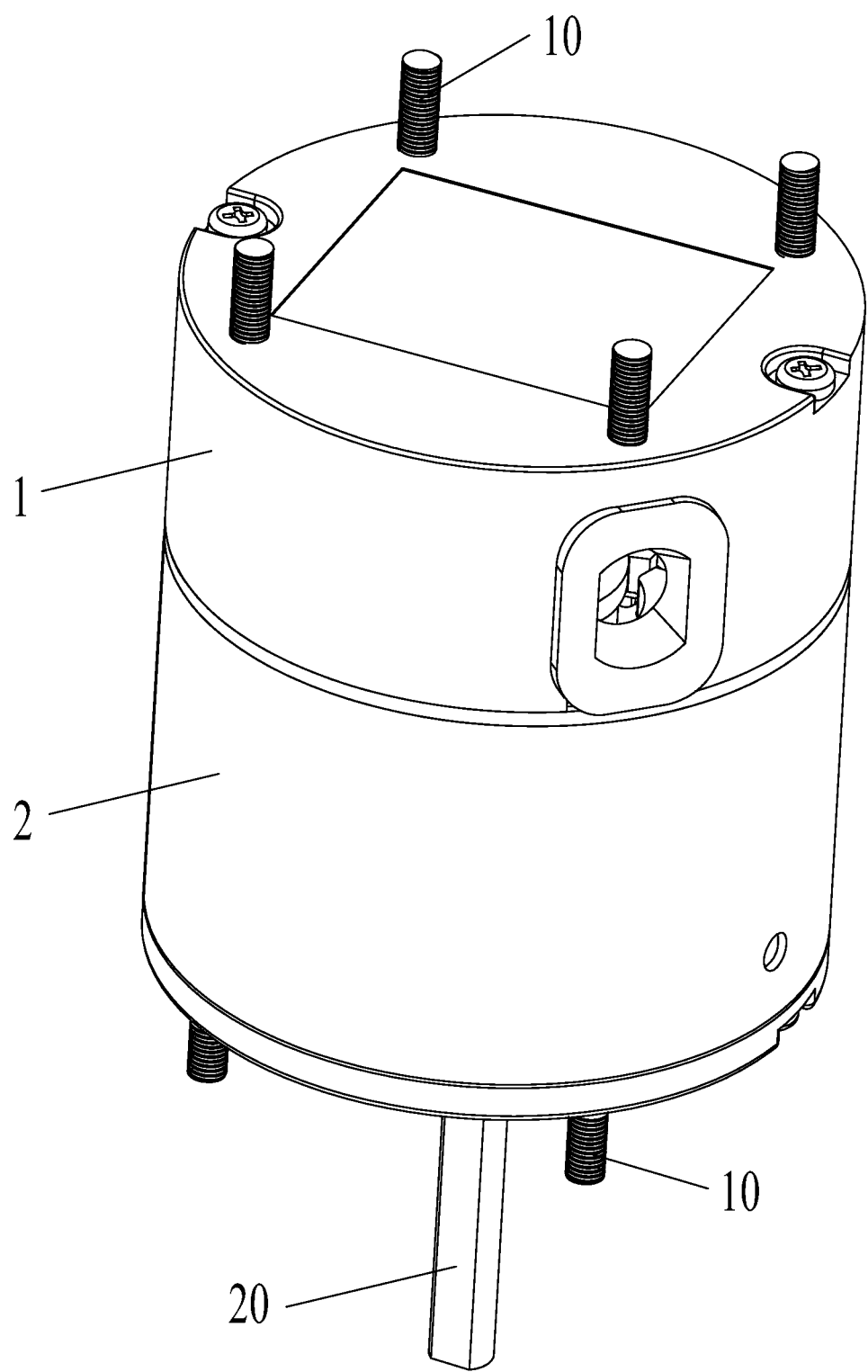
FIG. 3 is a stereogram of an ECM (Electronically Commutated Motor) involved in examples of the invention.
Figure 4:
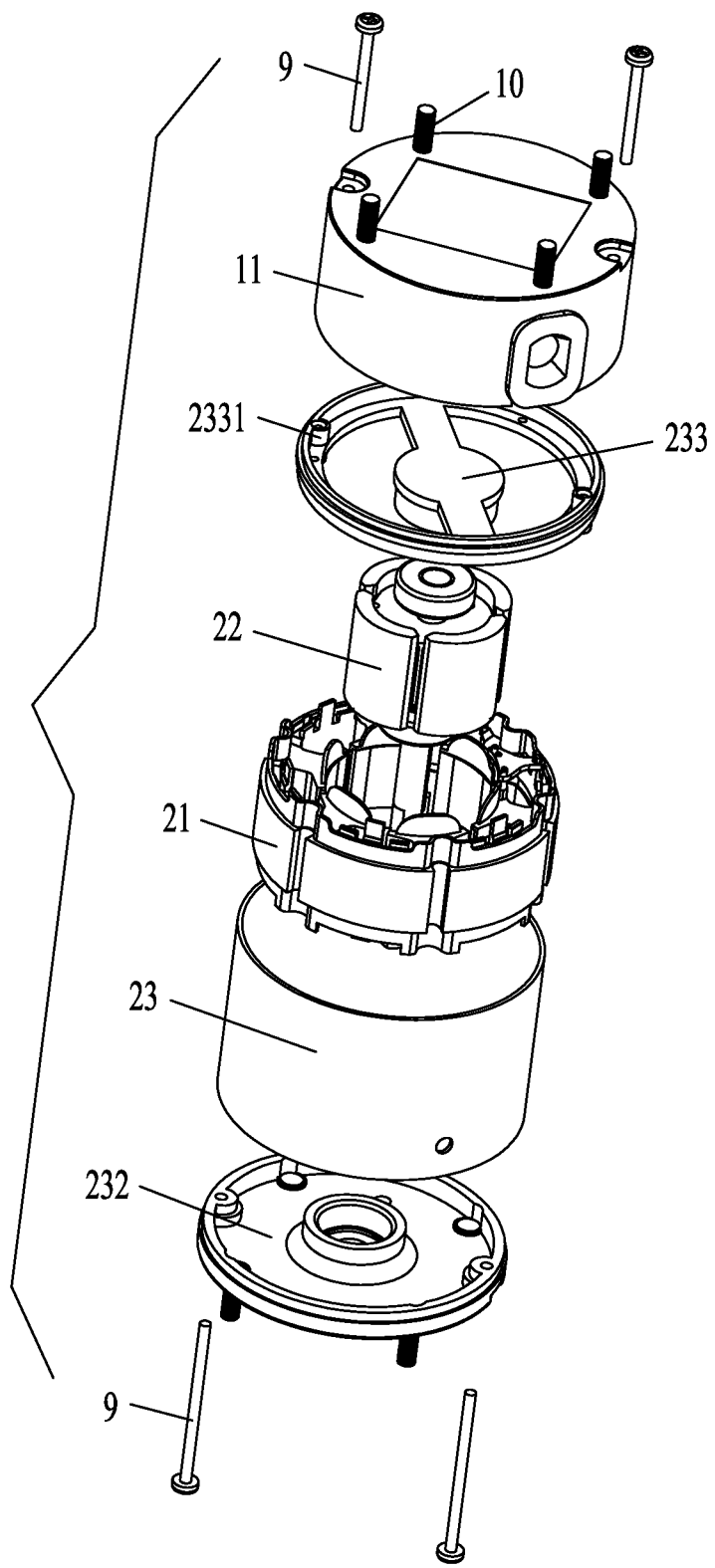
FIG. 4 is an exploded view of an ECM (Electronically Commutated Motor) involved in examples of the invention.
Figure 5:
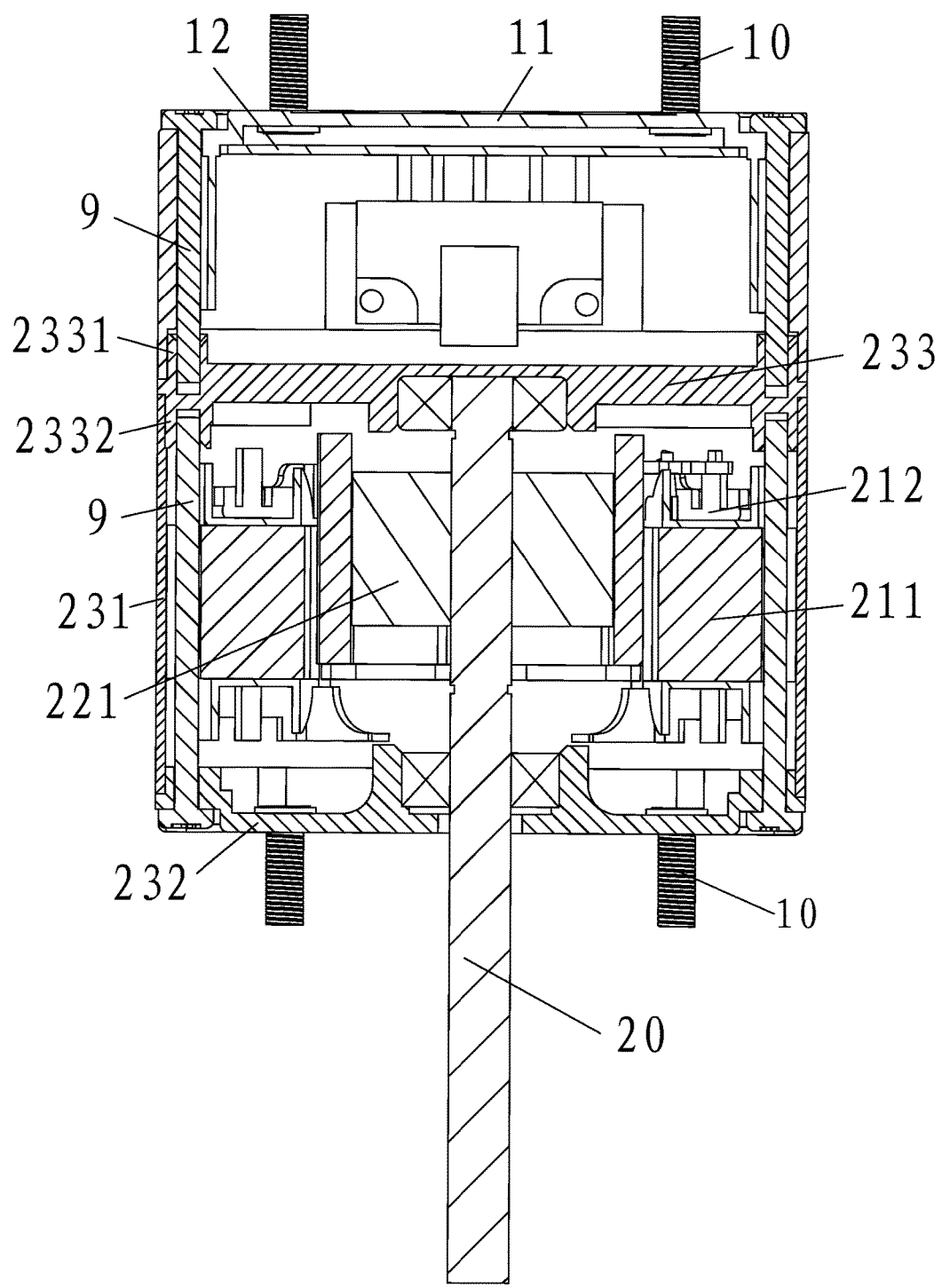
FIG. 5 is a cross-sectional view of an ECM (Electronically Commutated Motor) involved in examples of the invention.

As shown in FIG. 1, a multi-motor system comprises a plurality of ECMs (Electronically Commutated Motor). Each ECM comprises a motor controller and a motor body. The ECMs comprise a main ECM 100, and a plurality of subordinate ECMs 101. The main ECM 100 is connected to the subordinate ECMs 101 via a wire communication. Number of the subordinate ECMs is not restricted to four as shown in FIG. 1. As shown in FIG. 2, the main ECM 100 is connected to subordinate ECMs 101 via a wireless communication. A microprocessor of a motor controller of the main ECM 100 is connected to a first temperature detection unit 5 and a second temperature detection unit 6. The first temperature detection unit 5 and the second temperature detection unit 6 are disposed on different positions outside of the main ECM 100 to detect a temperature T2 and a temperature T2. The microprocessor automatically selects an operation parameter of the main ECM 100 in accordance with a temperature difference between the temperature T1 and the temperature T2. The main ECM 100 orders each subordinate ECMs 101 of the temperature T1 and the temperature T2, and each subordinate ECMs 101 selects an operation parameter in accordance with the temperature T1 and the temperature T2; or, the main ECM 100 sets up operation parameters for each subordinate ECMs 101 in accordance with the temperature T1 and the temperature T2at different positions, and orders each subordinate ECMs 101 to operate according to preset operation parameters. The operation parameter of the motor refers to rotational speed, operating current, torque, or air volume.

As shown in FIGS. 3-8, the main ECM 100 and a plurality of subordinate ECMs 101 are able to automatically control speed. The ECM which can automatically control speed comprises a motor controller 1 and a motor body 2. The motor body 2 comprises a rotary shaft 20, a stator assembly 21, a rotor assembly 22, and a shell assembly 23. The shell assembly 23 comprises a shell 231, a front cover 232, and a rear cover 233. The motor controller 1 comprises a control box 11 and a control circuit board 12 disposed in the control box 11. The rotor assembly 22 is disposed on the rotary shaft 20. The stator assembly 21 is connected to the shell 231, and the stator assembly 21 and the shell are sleeved on the rotor assembly 22. The front cover 232 and the rear cover 233 are disposed on two sides of the shell 231, respectively. The rotary shaft 20 is supported by a bearing of the front cover 232 and the rear cover 233. The control box 11 is disposed on the rear cover 233. A plurality of upper lug bosses 2331 and lower lug bosses 2332 are stretches out from edges of two surfaces of the rear cover 233. A coupling screw 9 inserts into a top of the control box 11, and is screwed in the upper lug boss 2331 to mount the control box 11 on an upper surface of the rear cover 233. The coupling screw 9 inserts into a top of the front cover 232, and is screwed in the lower lug boss 2332 to mount the front cover 232 and the rear cover 233 on two sides of the shell 231. The upper lug boss 2331 and the lower lug boss 2332 are both two in number. The upper lug boss 2331 and the lower lug boss 2332 are symmetrically distributed at two surfaces on the rear cover 233. The top of the control box 11 and the top of the front cover 232 are provided with a plurality of mounting screws 10, respectively.

Figure 6:
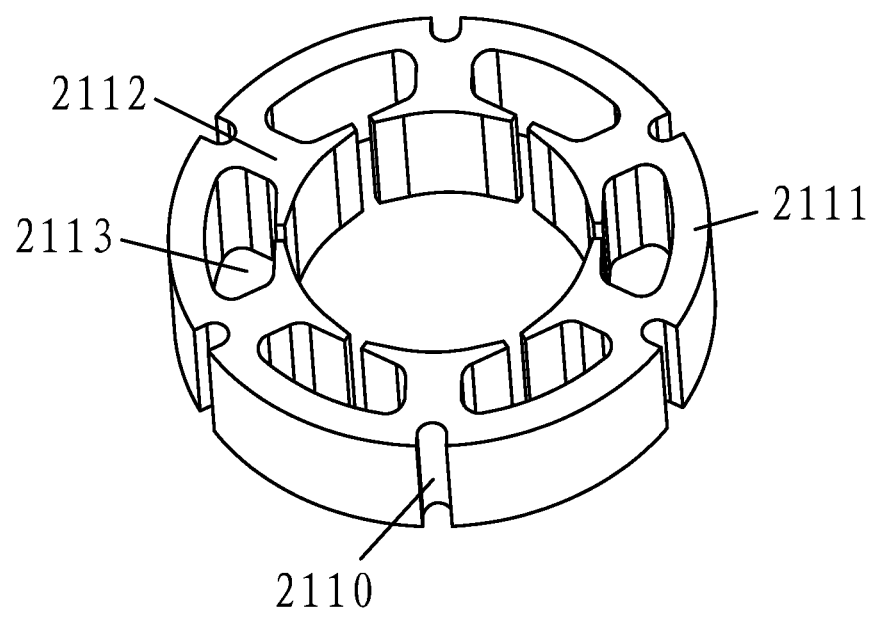
FIG. 6 is a stereogram of a stator core of an ECM (Electronically Commutated Motor) involved in examples of the invention.
Figure 7:
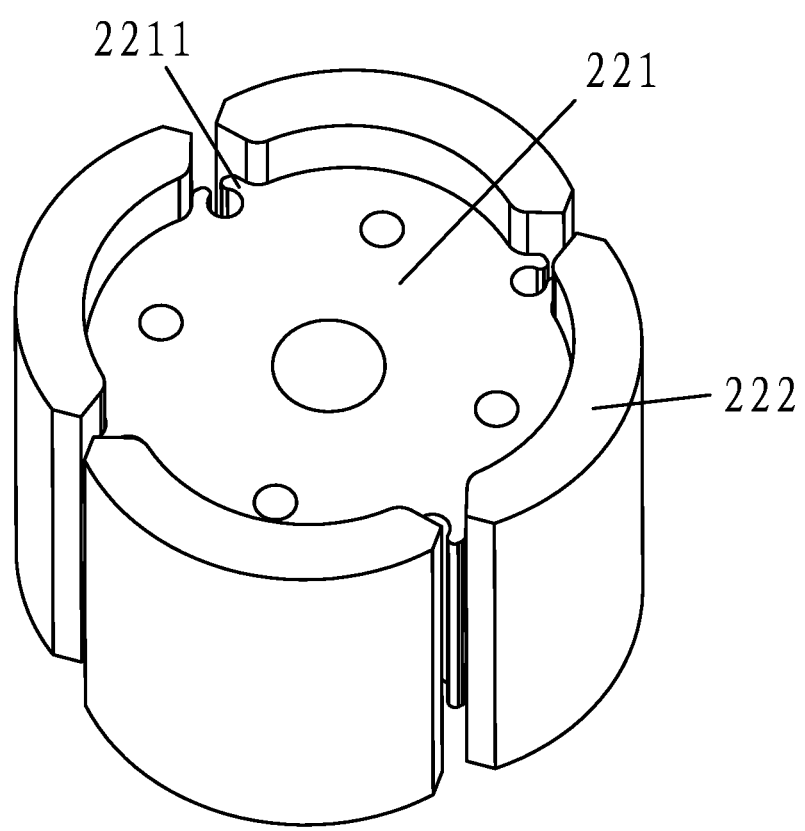
FIG. 7 is a stereogram of a rotor assembly of an ECM (Electronically Commutated Motor) involved in examples of the invention.
Figure 8:
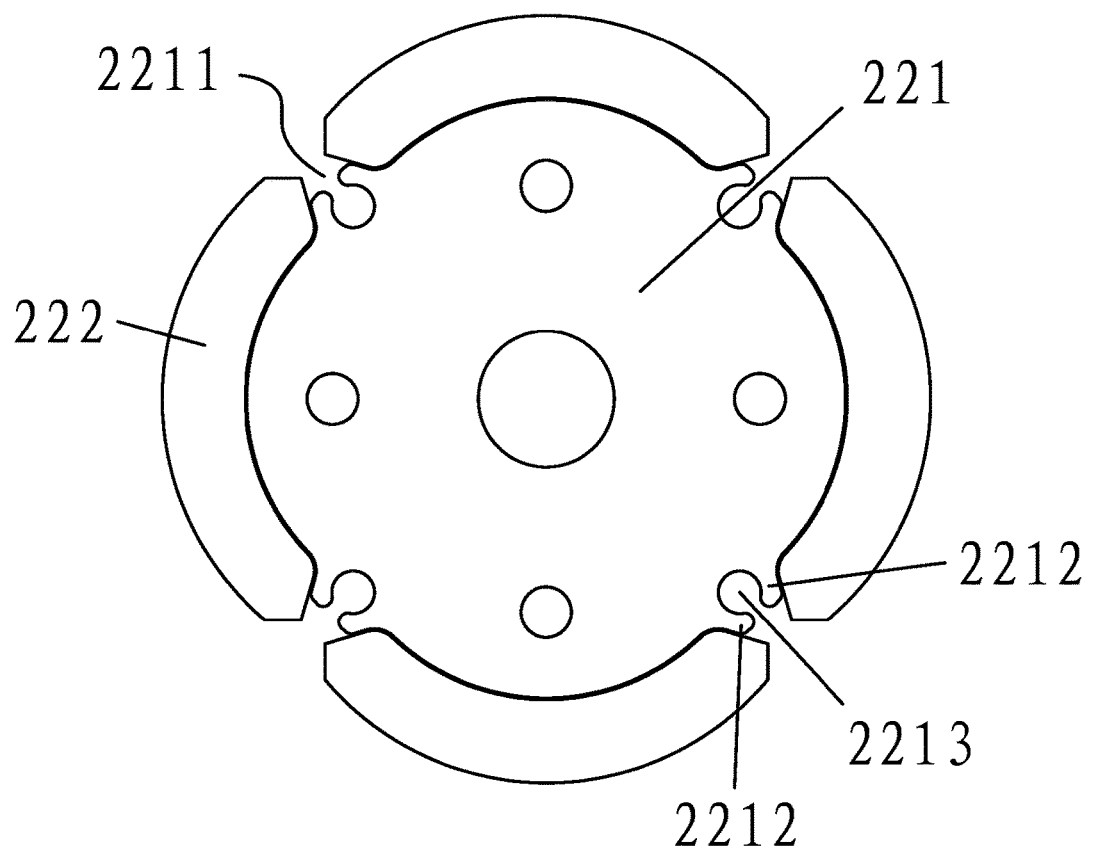
FIG. 8 is a top view of a rotor assembly of an ECM (Electronically Commutated Motor) involved in examples of the invention.

The stator assembly 21 comprises a stator core 211 and a coil winding 212 wound around the stator core 211. As shown in FIG. 6, the stator core 211 of the ECMs comprises a circular yoke portion 2111 and six tooth portions 2112 stretching out from the circular yoke portion 2111. A winding slot 2113 is formed between every two adjacent tooth portions 2112. An outer surface of the circular yoke portion 2111 is circumferentially provided with a groove 2110, and the coupling screw 9 passes through the groove 2110.

The rotor assembly 22 comprises a rotor core 221 and a permanent magnet 222 sheathed in the rotor core 221. An outer surface of the rotor assembly 221 is circumferentially provided with four positioning blocks 2211, and the four positioning blocks 2211 are circumferentially distributed at intervals on the outer surface of the rotor core 211. The permanent magnet 222 is circumferentially mounted at intervals on the outer surface of the rotor core 221, and is between every two adjacent positioning blocks 2211. The positioning block comprises two opposite lug bosses 2212, and a U-shaped slot 2213 is formed between the two lug bosses 2212.

Figure 9:
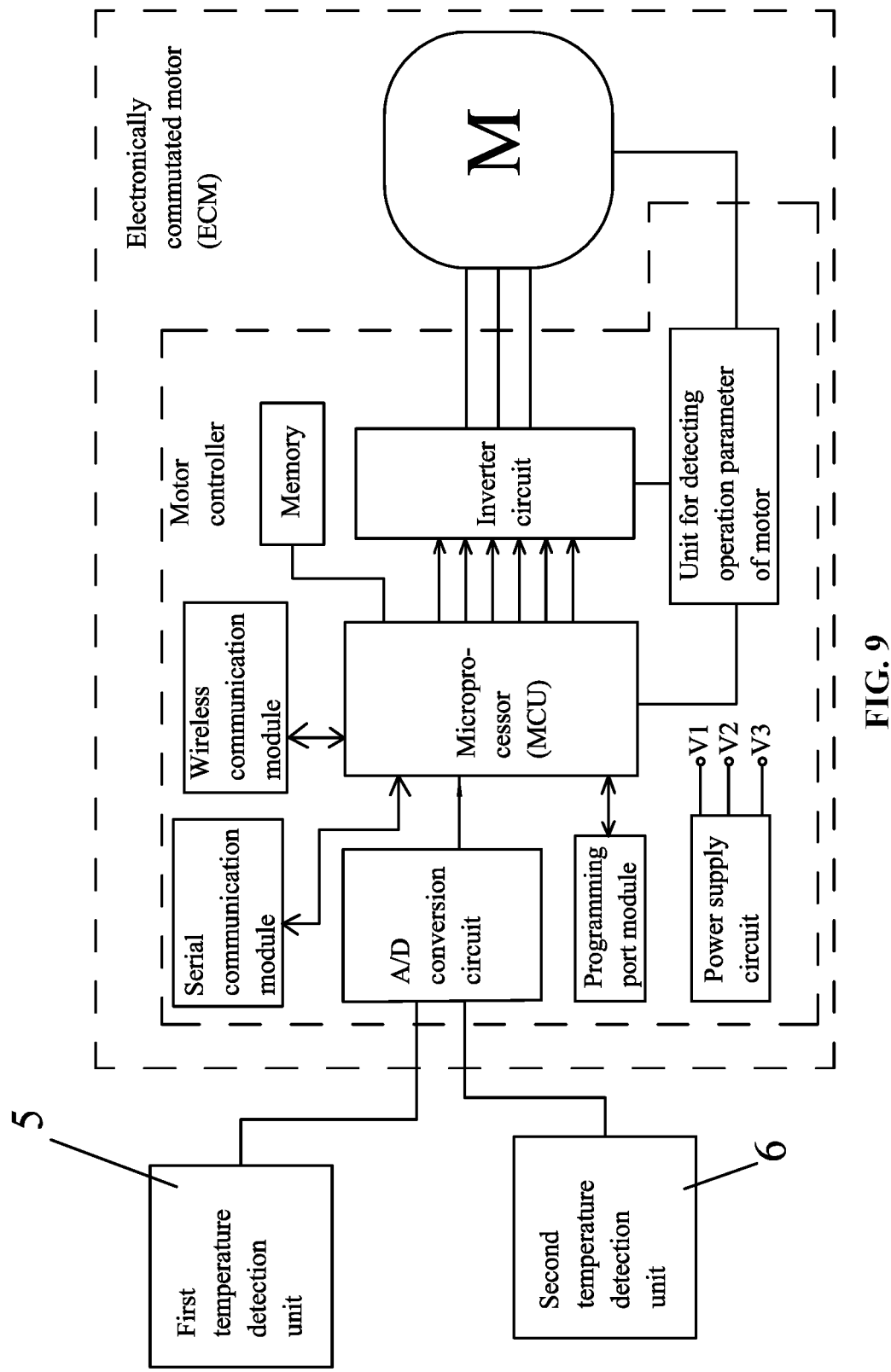
FIG. 9 is a circuit block diagram of a main ECM (Electronically Commutated Motor) involved in examples of the invention.
Figure 10:
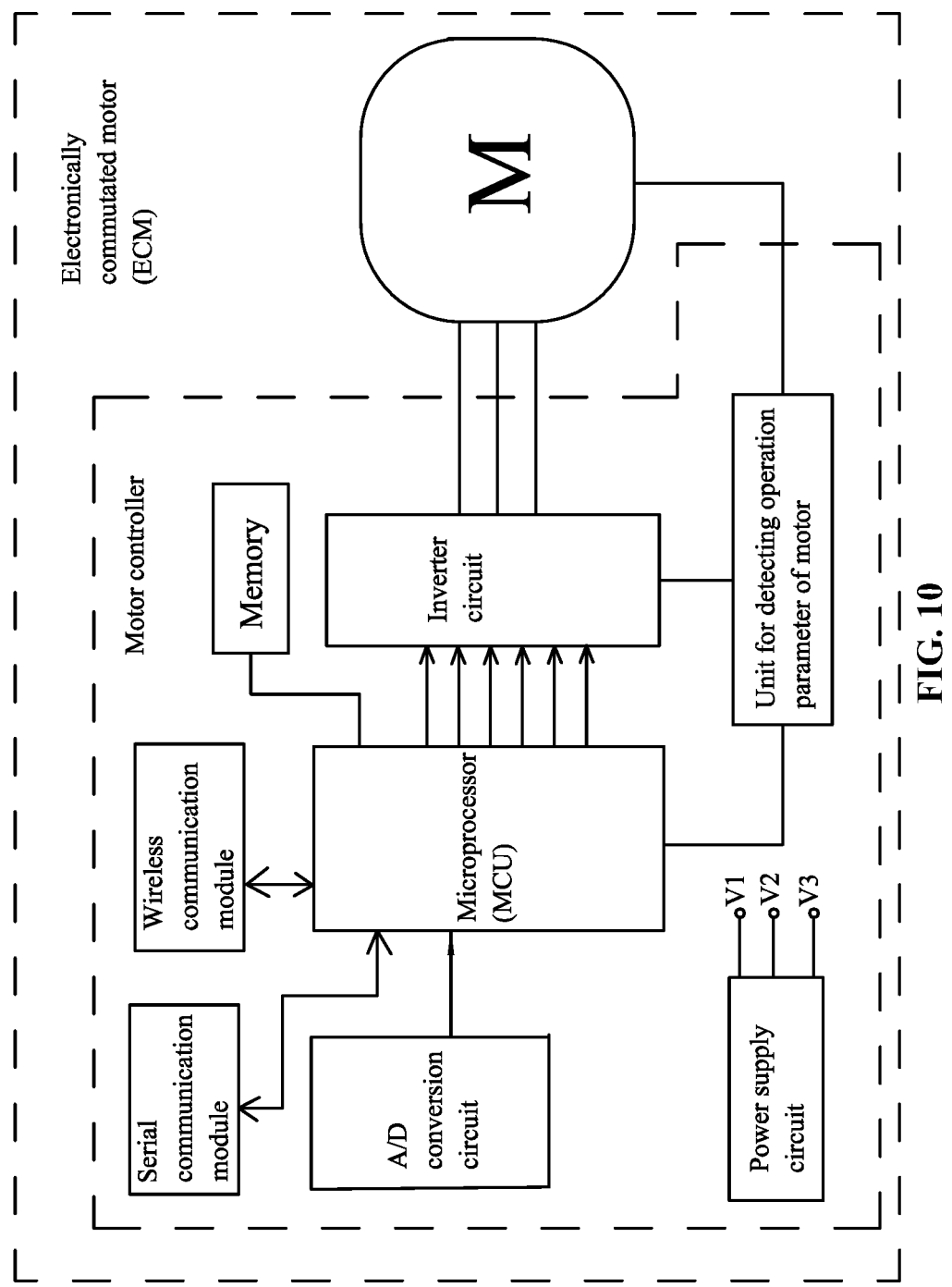
FIG. 10 is a circuit block diagram of a subordinate ECM (Electronically Commutated Motor) involved in examples of the invention.

As shown in FIGS. 9-10, the motor controller 1 comprises a control circuit board. The control circuit board is provided with a microprocessor, an inverter circuit, a detecting unit of operation parameter of the motor, a power supply circuit and a memory. The power supply circuit provides power for each part of a circuit on the control circuit board. The detecting unit of operation parameter of the motor transmits motor operation data to the microprocessor. An output end of the microprocessor is connected to an input end of the inverter circuit. An output end of the inverter circuit is connected to the coil winding 212 wound around the stator core 211. The microprocessor of a motor controller of the main ECM 100 is connected to a first temperature detection unit 5 and a second temperature detection unit 6. The first temperature detection unit 5 and the second temperature detection unit 6 are disposed on different positions outside of the main ECM 100 to detect a temperature T1 and a temperature T2. The subordinate ECMs 101 are not provided with the first temperature detection unit 5 and the second temperature detection unit 6. The first temperature detection unit 5 and the second temperature detection unit 6 are thermistor-type temperature detection units. The microprocessor in the motor controller of each ECM is connected to a serial communication module. The main ECM 100 and the subordinate ECMs 101 are connected to a bus via the respective serial communication module for communication; or, the microprocessor in the motor controller of each ECM is connected to a wireless communication module. The main ECM 100 and the subordinate ECMs 101 are communicated via the respective wireless communication module. The wireless communication module is selected from bluetooth module, satellite communications module, and mobile communication module. The main ECM 100 is provided with a programming port module to set up rotational velocities and steering, and subordinate ECMs 101 are not provided with the programming port module to save costs and simplify structure.

Figure 11:
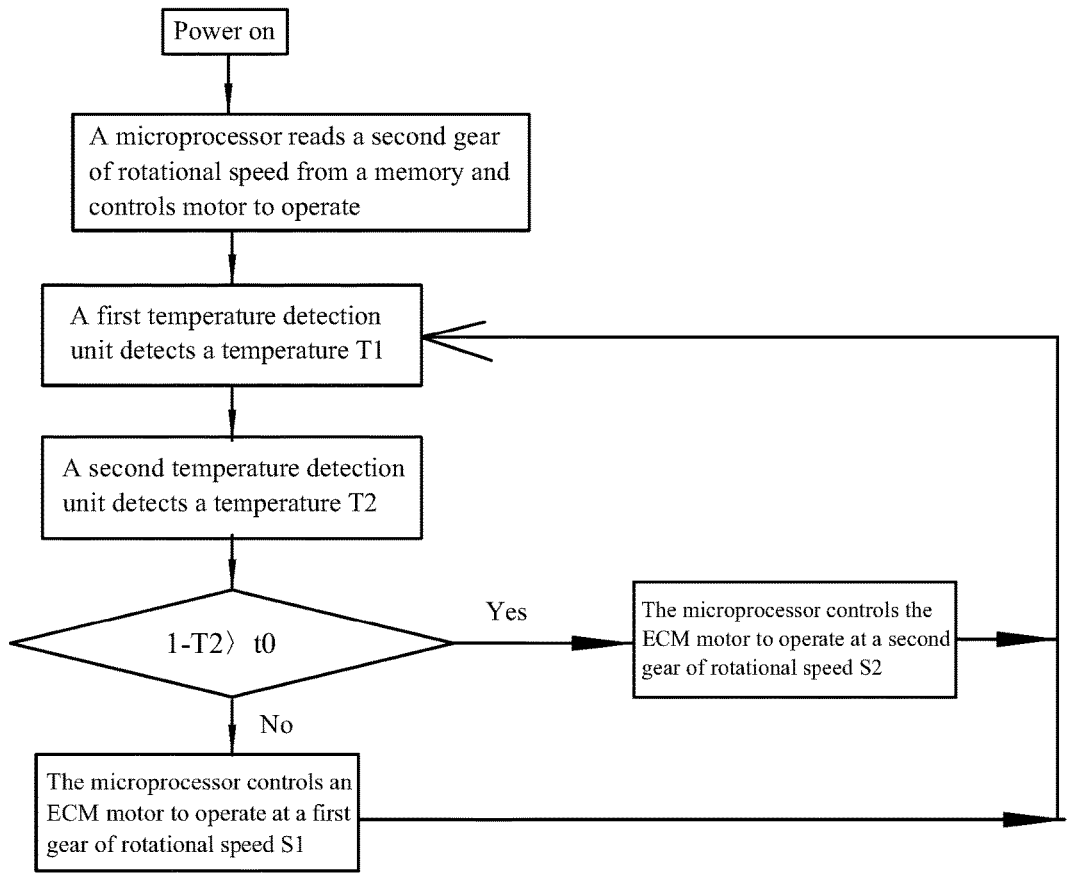
FIG. 11 is a flow chart of a first control method of a main ECM (Electronically Commutated Motor) involved in example 1 of the invention.

As shown in FIG. 11, a rotational velocity V of the main ECM comprises two gears of rotational velocity S1 and S2. When a temperature difference $\Delta T$ between the temperature T1 and the temperature T2 is smaller than a preset value t0, the microprocessor selects a first gear S1 and controls the motor to operate at a constant speed of the first gear of rotational velocity S1 ; when the temperature difference $\Delta T$ between the temperature T1 and the temperature T2 is bigger than the preset value t0, the microprocessor selects a second gear S2 and controls the motor to operate at a constant speed of the second gear of rotational velocity S2. As t0 is a critical value, in actual application, when the temperature difference changes around t0, the motor tends to shift between S1 and S2, causing an unstable operation, thus the following two solutions are put forward:

a) once the microprocessor determines a gear of rotational velocity, the rotational velocity is not allowed to change within n second(s), and 1<n<300. n according to actual situation can be 5 seconds, 10 seconds, one minute, and so on;

b) the temperature difference $\Delta T$ is an interval value between to−tb and to+tb, wherein to is a critical temperature difference, tb is an allowed fluctuant range of the temperature difference. When the temperature difference decreases from a higher temperature difference to the interval value, the microprocessor selects the first gear of rotational velocity S1 ; when the temperature difference increases from a lower temperature difference to the interval value, the microprocessor selects the second gear of rotational velocity S2. The temperature difference falls within the interval value between to−tb and to+tb. The rotational velocity of the main ECM is constant.

Figure 12:
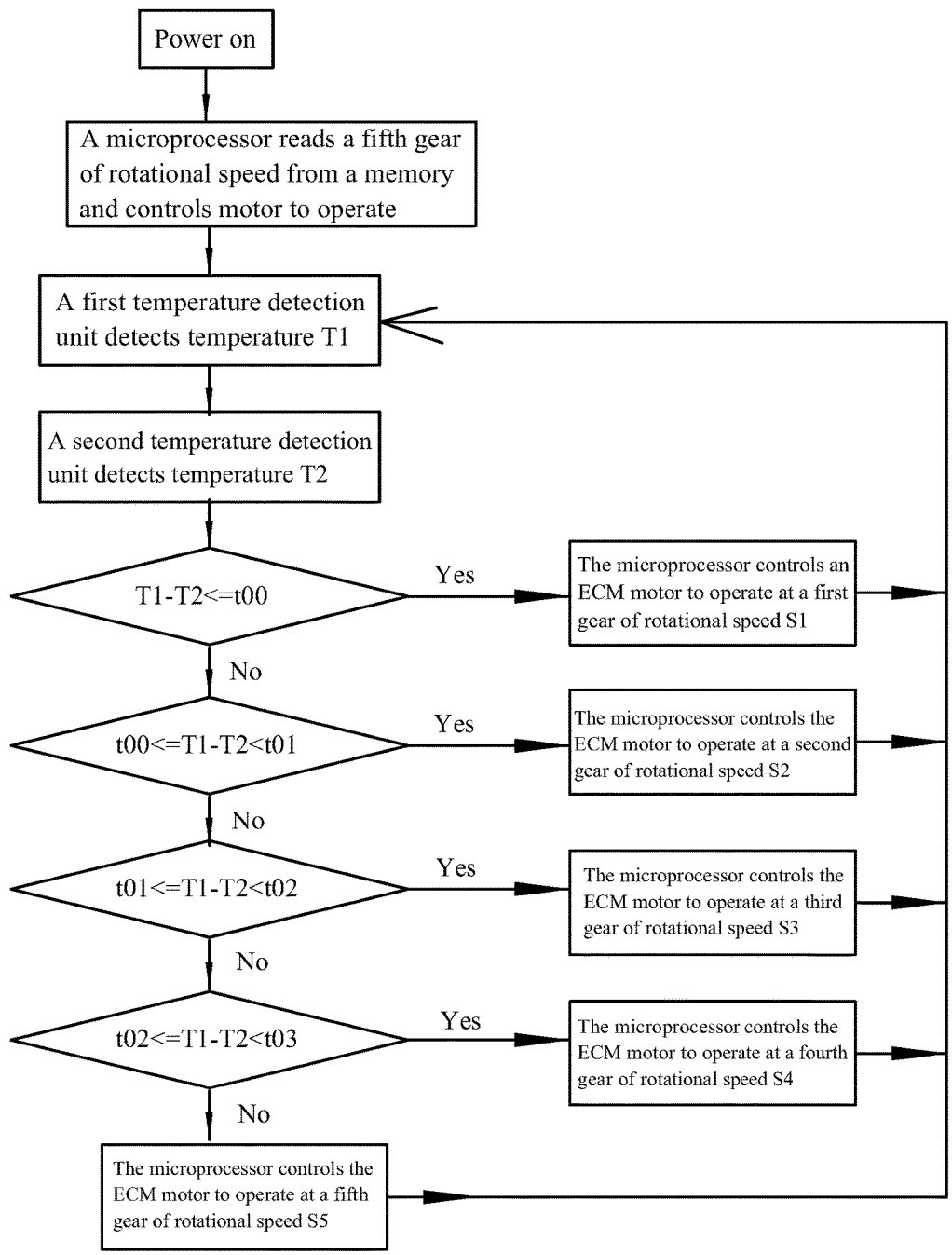
FIG. 12 is a flow chart of a second control method of a main ECM (Electronically Commutated Motor) involved in example 1 of the invention.
Figure 13:
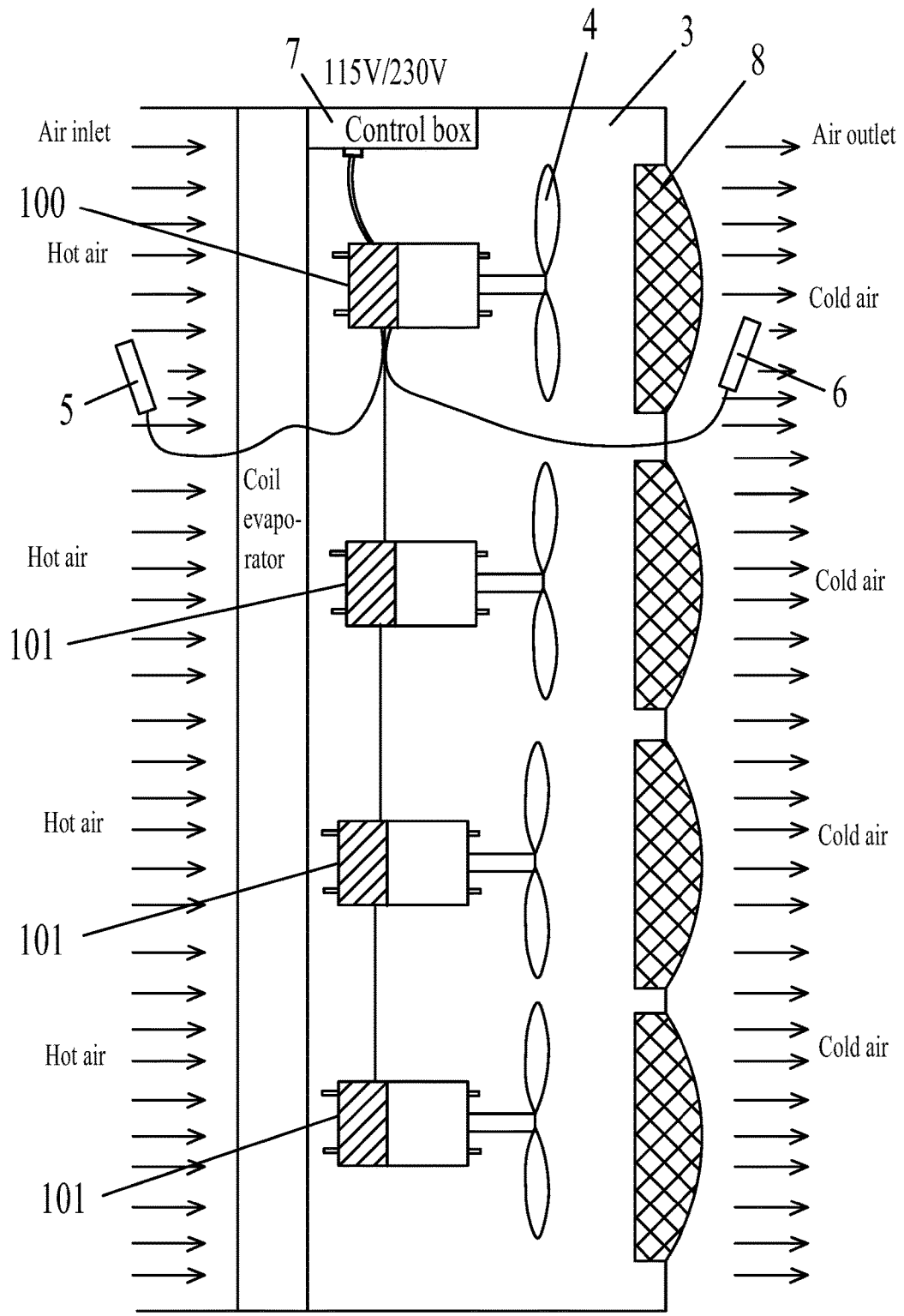
FIG. 13 is a schematic diagram of a freezer in example 4 of the invention.

As shown in FIG. 12, the rotational velocity V of the main ECM 100 comprises five gears of rotational velocity S1 , S2, S3, S4and S5. When the main ECM 100 is in operation, a highest gear—a fifth gear of rotational velocity is employed. When a temperature difference $\Delta T$ between the temperature T1 and the temperature T2 is smaller than or equals to a preset value t00, the microprocessor selects a first gear S1 and controls the motor to operate at a constant speed of the first gear of rotational velocity S1 ; when the temperature difference $\Delta T$ between the temperature T1 and the temperature T2 is bigger than the preset value t00, and is smaller than or equals to a preset value t01, the microprocessor selects a second gear S2 and controls the motor to operate at a constant speed of the second gear of rotational velocity S2 ; when the temperature difference $\Delta T$ between the temperature T1 and the temperature T2 is bigger than the preset value t01, and is smaller than or equals to a preset value t02, the microprocessor selects a third gear S3 and controls the motor to operate at a constant speed of the third gear of rotational velocity S3; when the temperature difference $\Delta T$ between the temperature T1 and the temperature T2 is bigger than the preset value t02, and is smaller than or equals to a preset value t03, the microprocessor selects a fourth gear S4and controls the motor to operate at a constant speed of the fourth gear of rotational velocity S4; when the temperature difference $\Delta T$ between the temperature T1 and the temperature T2 is bigger than the preset value t03, the microprocessor selects a fifth gear S5 and controls the motor to operate at a constant speed of the fifth gear of rotational velocity S5. Assuming that t00=10° C., t01=15° C., t02=20° C., and t03=25° C.

Example 2

As shown in FIG. 1, the ECMs comprise a main ECM 100, and a plurality of subordinate ECMs 101. A communication of the main ECM 100 and the subordinate ECMs 101 is one way. A microprocessor of a motor controller of the main ECM 100 is connected to a first temperature detection unit 5 and a second temperature detection unit 6. The first temperature detection unit 5 and the second temperature detection unit 6 are disposed on different positions outside of the main ECM 100 to detect a temperature T1 and a temperature T2. The microprocessor automatically selects an operation parameter of the main ECM 100 in accordance with a temperature difference between the temperature T1 and the temperature T2. The main ECM 100 orders each subordinate ECMs 101 of the temperature T1 and the temperature T2, and each subordinate ECMs 101 selects an operation parameter in accordance with the temperature T1 and the temperature T2, and each subordinate ECMs 101 does not reply to the main ECM; or, the main ECM 100 sets up operation parameters for each subordinate ECMs 101 in accordance with the temperature T1 and the temperature T2 at different positions, and orders each subordinate ECMs 101 to operate according to preset operation parameters, and each subordinate ECMs 101 does not reply to the main ECM 100. The operation parameter of the motor refers to rotational speed, operating current, torque, or air volume. The main ECM 100 and the subordinate ECMs 101 are communicated via a bus or a wireless module.

Example 3

As shown in FIG. 1, a method for controlling the multi-motor system, wherein the motor system comprises a plurality of ECMs. The ECMs comprise a main ECM 100, and a plurality of subordinate ECMs 101. A communication of the main ECM 100 and the subordinate ECMs 101 is two way. A microprocessor of a motor controller of the main ECM 100 is connected to a first temperature detection unit 5 and a second temperature detection unit 6. The first temperature detection unit 5 and the second temperature detection unit 6 are disposed on different positions outside of the main ECM 100 to detect a temperature T1 and a temperature T2. The microprocessor automatically selects an operation parameter of the main ECM 100 in accordance with a temperature difference between the temperature T1 and the temperature T2. The main ECM 100 orders each subordinate ECMs 101 of the temperature T1 and the temperature T2, and each subordinate ECMs 101 selects an operation parameter in accordance with the temperature T1 and the temperature T2, and each subordinate ECMs 101 replies to the main ECMs 100 that data has been received; or, the main ECM 100 sets up operation parameters for each subordinate ECMs 101 in accordance with the temperature T1 and the temperature T2 at different positions, and orders each subordinate ECMs 101 to operate according to preset operation parameters, and each subordinate ECMs 101 replies to the main ECM 100 that data has been received. The operation parameter of the motor refers to rotational speed, operating current, torque, or air volume. The main ECM 100 and the subordinate ECMs 101 are communicated via a bus or a wireless module.

Steps of the two way communication between the main ECM and each subordinate ECMs are as follows:
  a) defining every T second(s) as a communication cycle;
  b) sending a temperature difference report or rotational velocity report from the main ECM to the subordinate ECMs which are not allowed to reply in Ta (Ta<T) second(s) from a beginning of every cycle;
  c) allowing the subordinate ECMs to reply to the main ECM from Ta (Ta<T) second(s) to an end of every cycle, during which the main ECM is not allowed to send; the subordinate ECMs monitoring the bus to determine whether other motors are sending signals to the bus;
  d) sending a report immediately from the subordinate ECM when the bus is idle;
  e) waiting for a random interval to send the report from the subordinate ECM when the bus is busy; and
  f) waiting for next cycle to send the report from the subordinate ECM again when the bus is always busy during this cycle.

Steps of the two way communication between the main ECM and each subordinate ECMs are also as follows:
  a1) defining every T second(s) as a communication cycle;
  b1) sending a temperature difference report or rotational velocity report from the main ECM to the subordinate ECMs which are not allowed to reply in Ta (Ta<T) second(s) from a beginning of every cycle;
  c1) allowing the subordinate ECMs to reply to the main ECM from Ta (Ta<T) second(s) to an end of every cycle, during which the main ECM is not allowed to send; the subordinate ECMs monitoring the bus to determine whether other motors are sending signals to the bus;
  d1) sending a report immediately from the subordinate ECM when the bus is idle;
  e1) waiting for a random interval to send the report from the subordinate ECM when the bus is busy;
  f1) waiting for a random interval and returning to c1 when a report collision happens;
  g1) waiting for next cycle to send the report from the subordinate ECM again when the bus is always busy during this cycle.

The main ECM and the subordinate ECMs are assigned no addresses; or, the main ECM and the subordinate ECMs are assigned independent addresses, respectively.

Example 4

As shown in FIGS. 1-13, a freezer comprises a compressor, a coil evaporator, and an evaporator fan. The evaporator fan comprises a fan shell 3, a multi-motor system and several groups of fan blades 4. The compressor supplies a cooling agent for the coil evaporator. Beside an air inlet of the fan shell 3 is provided with the coil evaporator. Another side of the fan shell 3 is provided with an air outlet 32. The multi-motor system is disposed in the fan shell. Several groups of fan blades 4 are driven by the multi-motor system. The multi-motor system and the fan blades 4 are disposed between the coil evaporator and the air outlet 32. The multi-motor system comprises ECMs which are adapted to automatically control speed. The multi-motor system is the same as the multi-motor system described by example 1, thereby no need to repeat herein. A first temperature detection unit 5 which is connected to the main ECM 100 is disposed beside the air inlet of the fan shell 3 to detect a temperature T1 of hot air. A second temperature detection unit 6 which is connected to the main ECM 100 is disposed beside the air outlet 32 of the fan shell 3 to detect a temperature T2 of cold air. The microprocessor automatically selects an operation parameter of the main ECM 100 in accordance with a temperature difference between the temperature T1 and the temperature T2. The main ECM 100 orders each subordinate ECMs 101 of the temperature T1 and the temperature T2, and each subordinate ECMs 101 selects an operation parameter of a subordinate ECMs 101 in accordance with the temperature T1 and the temperature T2; or, the main ECM 100 sets up operation parameters for each subordinate ECMs 101 in accordance with the temperature T1 and the temperature T2 at different positions, and orders each subordinate ECMs 101 to operate according to preset operation parameters. The operation parameter of the motor refers to rotational speed, operating current, torque, or air volume.

As shown in FIG. 11, a rotational velocity V of the main ECM 100 comprises two gears of rotational velocity S1 and S2. When a temperature difference $\Delta T$ between the temperature T1 and the temperature T2 is smaller than a preset value t0, the microprocessor selects a first gear S1 and controls the motor to operate at a constant speed of the first gear of rotational velocity S1; when the temperature difference $\Delta T$ between the temperature T1 and the temperature T2 is bigger than the preset value t0, the microprocessor selects a second gear S2 and controls the motor to operate at a constant speed of the second gear of rotational velocity S2. When the motor is power on, the microprocessor initially employs a second gear S2 to operate the ECM. A first gear of rotational velocity is 800 rpm. The second gear of rotational velocity is 1550 rpm. The preset value t0 ranges from 1° C. to 50° C. The fan shell is provided with a control box 7, and the control box of each ECM is electrically connected to the control box. The first temperature detection unit 5 and the second temperature detection unit 6 are thermistor-type temperature detection units. The air outlet 32 of the fan shell 3 is provided with a filter 8. The second temperature detection unit 6 is disposed outside of the filter 8. The control box 7 inputs direct current of 115 V or 230 V.

Communications between the main ECM 100 and each subordinate ECMs 101 of example 2 and example 3 are used as references for example 4.

The invention claimed is:
1. A multi-motor system, comprising an air inlet, an air outlet, and a plurality of electronically commutated motors (ECMs), wherein:
  each electronically commutated motor (ECM) comprises a motor controller and a motor body;

the motor controller comprises a control circuit board; the control circuit board is provided with a microprocessor and a unit for detecting an operation parameter of the ECM the ECMs comprise a main ECM, and a plurality of subordinate ECMs;

the main ECM is connected to the subordinate ECMs via wire or wireless communication;

the microprocessor of the motor controller of the main ECM is connected to a first temperature detection unit and a second temperature detection unit; the first temperature detection unit and the second temperature detection unit are respectively disposed on the air inlet and the air outlet outside of the main ECM to detect a temperature T1 at the air inlet and a temperature T2 at the air outlet; the microprocessor automatically selects an operation parameter of the main ECM in accordance with a temperature difference between the temperature T1 and the temperature T2; and in operation, the main ECM informs each subordinate ECM of the temperature T1 and the temperature T2, and each subordinate ECM selects an operation parameter of the subordinate ECM in accordance with the temperature T1 and the temperature T2; or, the main ECM sets up operation parameters for each subordinate ECM in accordance with the temperature T1 and the temperature T2, and orders each subordinate ECM to operate according to preset operation parameters.

2. The system of claim 1, wherein the motor body comprises a stator assembly, a rotor assembly, and a shell assembly; the stator assembly and the rotor assembly are disposed inside the shell assembly; the stator assembly comprises a stator core and a coil winding wound around the stator core; the rotor assembly comprises a rotor core and a permanent magnet sheathed in the rotor core; and the control circuit board comprises an inverter circuit; the unit for detecting the operation parameter of the ECM transmits the operation parameter of the ECM to the microprocessor; an output end of the microprocessor is connected to an input end of the inverter circuit; an output end of the inverter circuit is connected to the coil winding wound around the stator core.

3. The system of claim 2, wherein the operation parameter of motor refers to rotational speed, operating current, torque, or air volume.

4. The system of claim 3, wherein a rotational velocity V of the main ECM comprises two gears of rotational velocity Si and S2; when the temperature difference between the temperature T1 and the temperature T2 is smaller than a preset value t0, the microprocessor selects a first gear of rotational velocity Si and controls the motor to operate at a constant speed of the first gear of rotational velocity S1; when the temperature difference between the temperature T1 and the temperature T2 is bigger than the preset value t0, the microprocessor selects a second gear of rotational velocity S2 and controls the motor to operate at a constant speed of the second gear of rotational velocity S2.

5. The system of claim 4, wherein once the microprocessor determines a gear of rotational velocity, the rotational velocity is not allowed to change within n second(s), wherein in the n second(s), 1<n<300.

6. The system of claim 4, wherein when the temperature difference is higher than to+tb, the microprocessor selects the first gear of rotational velocity S1; when the temperature difference is lower than to−tb, the microprocessor selects the second gear of rotational velocity S2; when the temperature difference is an interval value between to−tb and to+tb, the rotational velocity of the main ECM is constant.

7. The system of claim 2, wherein a rotational velocity V of the main ECM comprises five gears of rotational velocity S1, S2, S3, S4 and S5;

when the temperature difference between the temperature T1 and the temperature T2 is smaller than or equals to a preset value t00, the microprocessor selects a first gear of rotational velocity S1 and controls the motor to operate at a constant speed of the first gear of rotational velocity S1;

when the temperature difference between the temperature T1 and the temperature T2 is bigger than the preset value t00, and is smaller than or equals to a preset value t01, the microprocessor selects a second gear of rotational velocity S2 and controls the motor to operate at a constant speed of the second gear of rotational velocity S2;

when the temperature difference between the temperature T1 and the temperature T2 is bigger than the preset value t01, and is smaller than or equals to a preset value t02, the microprocessor selects a third gear S3 and controls the motor to operate at a constant speed of the third gear of rotational velocity S3;

when the temperature difference between the temperature T1 and the temperature T2 is bigger than the preset value t02, and is smaller than or equals to a preset value t03, the microprocessor selects a fourth gear S4 and controls the motor to operate at a constant speed of the fourth gear of rotational velocity S4;

when the temperature difference between the temperature T1 and the temperature T2 is bigger than the preset value t03, the microprocessor selects a fifth gear S5 and controls the motor to operate at a constant speed of the fifth gear of rotational velocity S5.

8. The system of claim 2, wherein the first temperature detection unit and the second temperature detection unit are thermistor-type temperature detection units.

9. The system of claim 2, wherein the microprocessor in the motor controller of each ECM is connected to a serial communication module; the main ECM and the subordinate ECMs are connected to a bus via respective serial communication module for communication.

10. The system of claim 2, wherein the microprocessor in the motor controller of each ECM is connected to a wireless communication module; the main ECM and the subordinate ECMs are communicated via respective wireless communication module for communication.

11. The system of claim 10, wherein the wireless communication module is configured to operate using a wireless technology selected from bluetooth, satellite communication, and mobile communication.

12. The system of claim 2, wherein the main ECM is adapted to set up rotational velocities.

13. The system of claim 1, wherein the operation parameter of motor refers to rotational speed, operating current, torque, or air volume.

14. The system of claim 13, wherein a rotational velocity V of the main ECM comprises two gears of rotational velocity S1 and S2; when the temperature difference between the temperature T1 and the temperature T2 is smaller than a preset value t0, the microprocessor selects a first gear of rotational velocity Si and controls the motor to operate at a constant speed of the first gear of rotational velocity S1; when the temperature difference between the temperature T1 and the temperature T2 is bigger than the preset value t0, the microprocessor selects a second gear of rotational velocity S2 and controls the motor to operate at a constant speed of the second gear of rotational velocity S2.

15. The system of claim 14, wherein once the microprocessor determines a gear of rotational velocity, the rotational velocity is not allowed to change within n second(s), wherein in the n second(s), 1<n<300.

16. The system of claim 14, wherein when the temperature difference is higher than to+tb, the microprocessor selects the first gear of rotational velocity S1; when the temperature difference is lower than to−tb, the microprocessor selects the second gear of rotational velocity S2; when the temperature difference is an interval value between to−tb and to+tb, the rotational velocity of the main ECM is constant.

17. The system of claim 1, wherein
a rotational velocity V of the main ECM comprises five gears of rotational velocity S1, S2, S3, S4 and S5;
when the temperature difference between the temperature T1 and the temperature T2 is smaller than or equals to a preset value t00, the microprocessor selects a first gear of rotational velocity S1 and controls the motor to operate at a constant speed of the first gear of rotational velocity S1;
when the temperature difference between the temperature T1 and the temperature T2 is bigger than the preset value t00, and is smaller than or equals to a preset value t01, the microprocessor selects a second gear of rotational velocity S2 and controls the motor to operate at a constant speed of the second gear of rotational velocity S2;
when the temperature difference between the temperature T1 and the temperature T2 is bigger than the preset value t01, and is smaller than or equals to a preset value t02, the microprocessor selects a third gear S3 and controls the motor to operate at a constant speed of the third gear of rotational velocity S3;
when the temperature difference between the temperature T1 and the temperature T2 is bigger than the preset value t02, and is smaller than or equals to a preset value t03, the microprocessor selects a fourth gear S4 and controls the motor to operate at a constant speed of the fourth gear of rotational velocity S4;
when the temperature difference between the temperature T1 and the temperature T2 is bigger than the preset value t03, the microprocessor selects a fifth gear S5 and controls the motor to operate at a constant speed of the fifth gear of rotational velocity S5.

18. The system of claim 1, wherein the first temperature detection unit and the second temperature detection unit are thermistor-type temperature detection units.

19. The system of claim 1, wherein the microprocessor in the motor controller of each ECM is connected to a serial communication module; the main ECM and the subordinate ECMs are connected to a bus via respective serial communication module for communication.

20. The system of claim 1, wherein the microprocessor in the motor controller of each ECM is connected to a wireless communication module; the main ECM and the subordinate ECMs are communicated via respective wireless communication module for communication.

21. The system of claim 20, wherein the wireless communication module is configured to operate using a wireless technology selected from bluetooth, satellite communication, and mobile communication.

22. The system of claim 1, wherein the main ECM is adapted to set up rotational velocities.

23. A method for controlling a multi-motor system, the multi-motor system comprising an air inlet, an air outlet, and a plurality of electronically commutated motors (ECMs); the ECMs comprising a main electronically commutated motor (ECM) and a plurality of subordinate ECMs, wherein the main ECM and the subordinate ECMs are one way communicated; a microprocessor of a motor controller of the main ECM is connected to a first temperature detection unit and a second temperature detection unit; the first temperature detection unit and the second temperature detection unit are respectively disposed on the air inlet and the air outlet outside of the main ECM to detect a temperature T1 at the air inlet and a temperature T2 at the air outlet;
the method comprising allowing the first temperature detection unit and the second temperature detection unit to detect the temperature T1 and the temperature T2, selecting an operation parameter of the main ECM by the microprocessor in accordance with a temperature difference between the temperature T1 and the temperature T2, informing each subordinate ECM of the temperature T1 and the temperature T2 by the main ECM, and selecting by each subordinate ECM an operation parameter of the subordinate ECM in accordance with the temperature T1 and the temperature T2, and each subordinate ECM providing no reply to the main ECM; or, setting up by the main ECM operation parameters for each subordinate ECM in accordance with the temperature T1 and the temperature T2, ordering each subordinate ECM to operate according to preset operation parameters, and each subordinate ECM providing no reply to the main ECM; wherein the operation parameter of motor refers to rotational speed, operating current, torque, or air volume.

24. The method of claim 23, wherein the main ECM and the subordinate ECMs are communicated via a bus.

25. The method of claim 23, wherein the main ECM and the subordinate ECMs are communicated via a wireless communication module.

26. A method controlling a multi-motor system, the multi-motor system comprising an air inlet, an air outlet, and a plurality of electronically commutated motors (ECMs); the ECMs comprising a main electronically commutated motor (ECM) and a plurality of subordinate ECMs, wherein the main ECM and the subordinate ECMs are two way communicated; a microprocessor of a motor controller of the main ECM is connected to a first temperature detection unit and a second temperature detection unit; the first temperature detection unit and the second temperature detection unit are respectively disposed on the air inlet and the air outlet outside of the main ECM to detect a temperature T1 at the air inlet and a temperature T2 at the air outlet;
the method comprising allowing the first temperature detection unit and the second temperature detection unit to detect the temperature T1 and the temperature T2, selecting an operation parameter of the main ECM by the microprocessor in accordance with a temperature difference between the temperature T1 and the temperature T2, informing each subordinate ECM of the temperature T1 and the temperature T2 by the main ECM, and selecting by each subordinate ECM an operation parameter of the subordinate ECM in accordance with the temperature T1 and the temperature T2, and each subordinate ECM providing reply to the main ECM; or, setting up by the main ECM operation parameters for each subordinate ECM in accordance with the temperature T1 and the temperature T2, ordering each subordinate ECM to operate according to preset operation parameters, and each subordinate ECM providing reply to the main ECM; wherein the operation parameter of motor refers to rotational speed, operating current, torque, or air volume.

27. The method of claim 26, wherein the main ECM and the subordinate ECMs are communicated via a bus.

28. The method of claim 27, wherein steps of a two way communication between the main ECM and each subordinate ECM are as follows:
- a) defining every T second(s) as a communication cycle;
- b) sending a temperature difference report or a rotational velocity report from the main ECM to the subordinate ECMs which are not allowed to reply in Ta (Ta<T) second(s) from a beginning of every cycle;
- c) allowing the subordinate ECMs to reply to the main ECM from Ta (Ta<T) second(s) to an end of every cycle, during which the main ECM is not allowed to send; the subordinate ECMs monitoring the bus to determine whether other motors are sending signals to the bus;
- d) sending a report from the subordinate ECM at the moment the subordinate ECM finds that the bus is idle;
- e) waiting for an interval to send the report from the subordinate ECM after the moment the subordinate ECM finds that the bus is busy;
- f) waiting for next cycle to send the report from the subordinate ECM again when the bus is always busy during this cycle.

29. The method of claim 27, wherein steps of a two way communication between the main ECM and each subordinate ECM are as follows:
- a1) defining every T second(s) as a communication cycle;
- b1) sending a temperature difference report or a rotational velocity report from the main ECM to the subordinate ECMs which are not allowed to reply in Ta (Ta<T) second(s) from a beginning of every cycle;
- c1) allowing the subordinate ECMs to reply to the main ECM from Ta (Ta<T) second(s) to an end of every cycle, during which the main ECM is not allowed to send; the subordinate ECMs monitoring the bus to determine whether other motors are sending signals to the bus;
- d1) sending a report from the subordinate ECM at the moment the subordinate ECM finds that the bus is idle;
- e1) waiting for an interval to send the report from the subordinate ECM after the moment the subordinate ECM finds that the bus is busy;
- f1) waiting for a random interval and returning to c1 when a report collision happens;
- g1) waiting for next cycle to send the report from the subordinate ECM again when the bus is always busy during this cycle.

30. The method of claim 26, wherein the main ECM and the subordinate ECMs are communicated via a wireless communication module.

* * * * *